United States Patent [19]
Byerly

[11] 3,856,245
[45] Dec. 24, 1974

[54] PIPE MOUNTING CLAMP

[75] Inventor: Robert M. Byerly, Burbank, Calif.

[73] Assignee: Viking Industries, Inc., Chatsworth, Calif.

[22] Filed: Mar. 14, 1973

[21] Appl. No.: 341,276

[52] U.S. Cl. .......................... 248/54 R, 248/74 PB
[51] Int. Cl. ............................................. F16l 3/12
[58] Field of Search ............ 248/54 R, 74 B, 74 PB, 248/56, 74 R; 24/279; 138/99; 277/208; 174/40 CC; 285/192, 158, 138

[56] References Cited
UNITED STATES PATENTS

| | | | |
|---|---|---|---|
| 2,387,295 | 10/1945 | Robertson | 248/74 B |
| 2,393,033 | 1/1946 | Ellinwood | 174/40 CC |
| 2,417,741 | 3/1947 | Dillon | 24/279 |
| 2,709,558 | 5/1955 | Young | 248/74 B |
| 2,778,695 | 1/1957 | Sturtevant | 277/208 X |
| 2,936,186 | 5/1960 | Dunmire | 24/279 X |
| 3,315,971 | 4/1967 | Sakurada | 277/208 X |
| 3,325,175 | 6/1967 | Lower | 277/208 X |
| 3,334,928 | 8/1967 | Schmunk | 285/236 X |
| 3,567,165 | 3/1971 | White | 248/74 R X |
| 3,664,691 | 5/1972 | Nakamura | 285/112 |

FOREIGN PATENTS OR APPLICATIONS

| | | | |
|---|---|---|---|
| 599,818 | 11/1959 | Italy | 174/40 CC |
| 963,599 | 7/1964 | Great Britain | 248/74 R |

*Primary Examiner*—Roy D. Frazier
*Assistant Examiner*—Rodney H. Bonck
*Attorney, Agent, or Firm*—Lindenberg, Freilich, Wasserman, Rosen & Fernandez

[57] ABSTRACT

A clamp for mounting pipes on a support, including a band that encircles the pipe and has a pair of end tabs that can be held together, and a mount strap fixed to the band and having mounting holes whose axes are out of line with the tabs. An elastomeric cushion on the band has a pair of radially extending end ridges formed to curl out and a middle ridge of smaller height and located between the end ridges.

3 Claims, 11 Drawing Figures

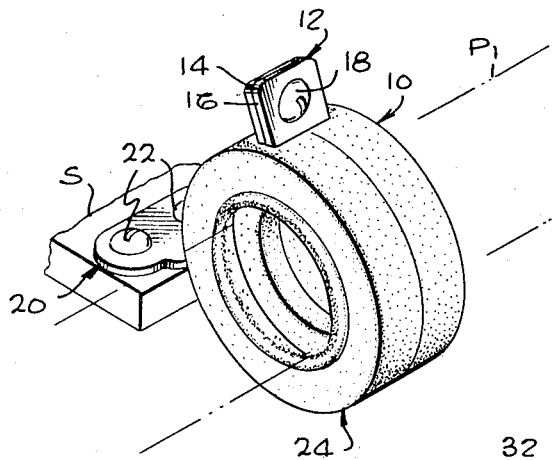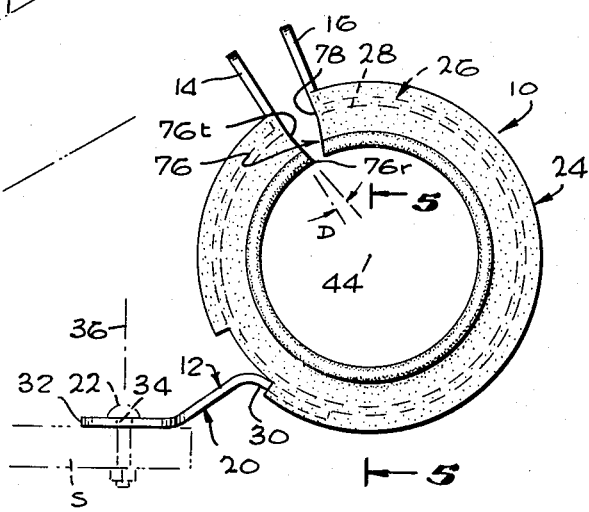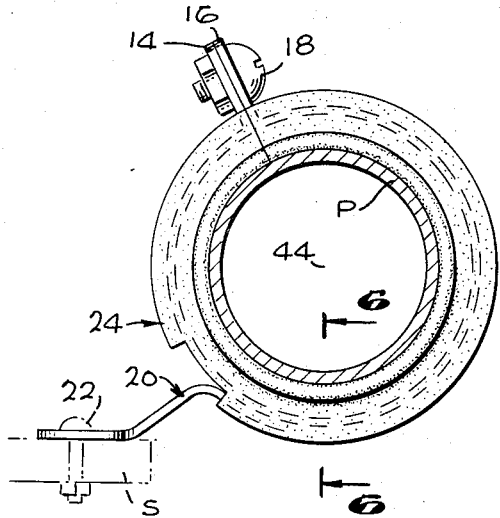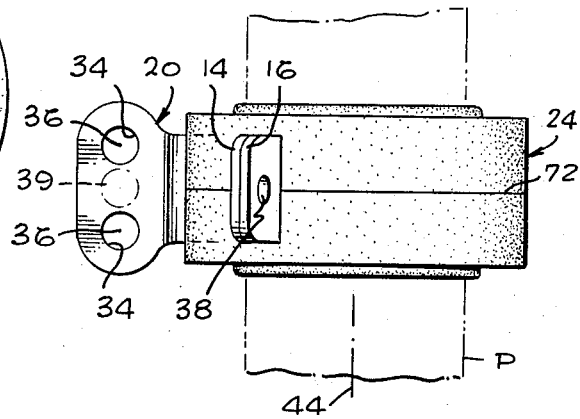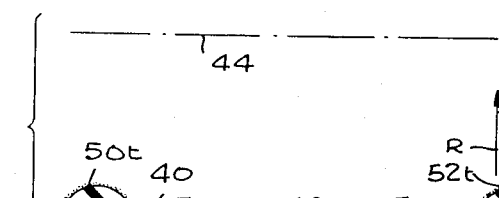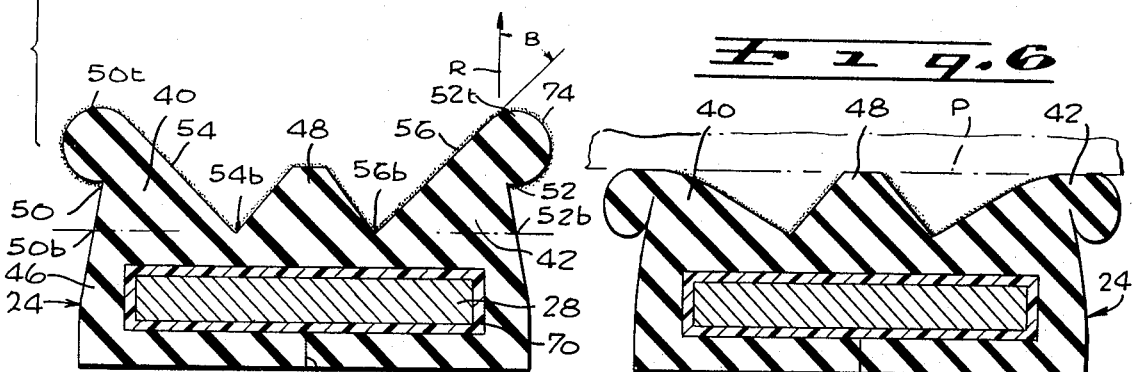

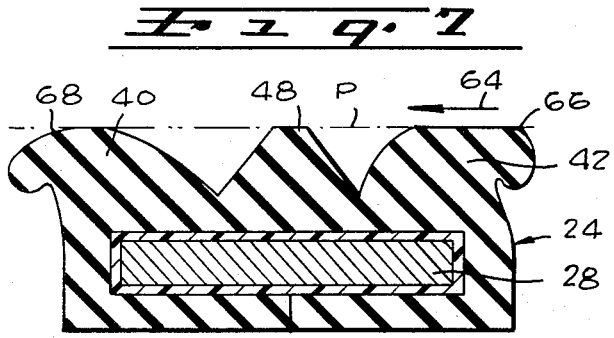
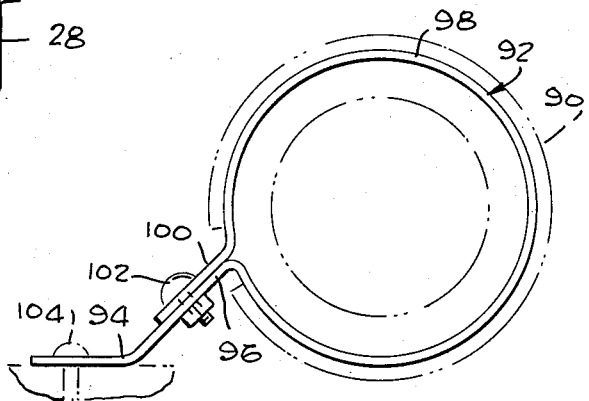
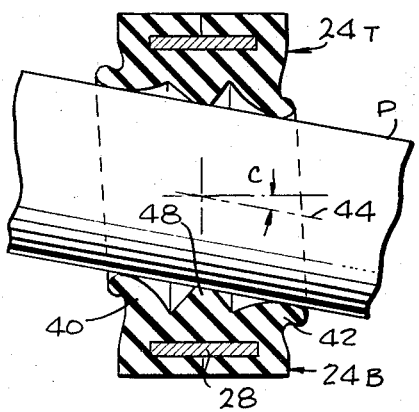
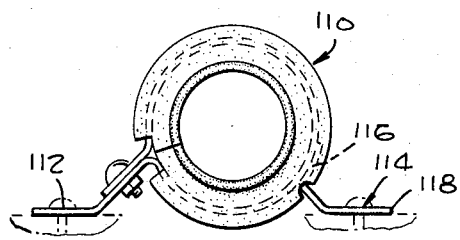
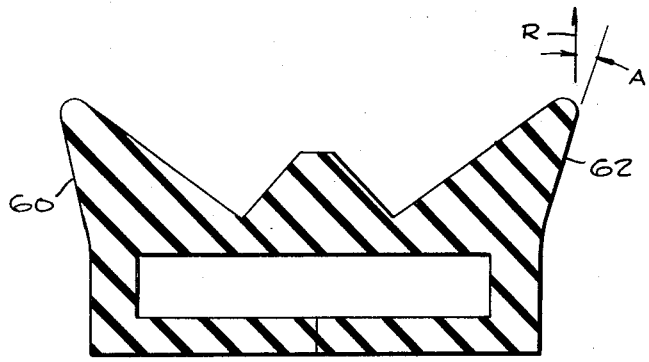

PIPE MOUNTING CLAMP

BACKGROUND OF THE INVENTION

This invention relates to clamps of the type used to mount pipes and the like on supports.

Clamps which are used to mount hydraulic lines within airplanes often have a high failure rate, so that the hydraulic line may become loose and break. The service condition of these clamps is severe because the hydraulic lines are subject to surges which tend to move them axially as well as to tilt them and move them laterally. Axial hydraulic line movements can produce especially high strains and wear because large axial movements such as an inch may be encountered for a restrained hydraulic line in an aircraft. Furthermore, considerable abrasive dust particles may be present which are kicked up by the airplane as it moves along a runway, and these particles can wear through the clamp and through the hydraulic line.

A typical clamp has utilized a band of steel with a pair of tabs at its ends, and a cushion of elastomeric material on the band. A bolt is projected through holes in the tabs and through a hole in a mounting station on the airplane, so that when the bolt is tightened it simultaneously tightens the clamp on the pipe and holds it securely to the airplane. This has provided a rigid mounting of the hydraulic line because the tabs are close to the pipe. However, it is very difficult to restrain a hydraulic line even with heavy duty clamps, where the line is urged to move under the forces of the high pressure pulses that are commonly encountered. Furthermore, the clamps that have been available were found to amplify vibrations, which leads to even more rapid wear.

SUMMARY OF THE INVENTION

In accordance with one embodiment of the present invention, a pipe clamp is provided which securely holds a pipe to a mounting location, but which permits a wide degree of movement of the pipe under surge conditions without loosening or breaking the clamp and without producing excessive wear on the clamp or pipe even in an abrasive environment. Furthermore, the clamp dampens vibrations, so that there is a minimum of vibration-caused movements that can cause wear. The clamp includes a steel strip, with a portion that encircles the pipe, a pair of end tabs that can be fastened together to hold the encircling portion tightly on the pipe, and a separate mounting portion for mounting the clamp on an airplane or other supporting structure. The mounting portion has at least one hole with an axis that is out of line with the tightening tabs, so that a screwdriver can be applied to a bolt projecting through the mount hole without interference from the tabs. The fact that the mounting location is separated from the tightening tabs, means that short tabs can be used to assure secure tightening of the clamp on a pipe, and yet the mounting portion can be of sufficient length to provide the needed freedom of movement of the pipe.

The clamp includes a cushion of elastomeric material that covers the inside of the steel band. In the untightened clamp, the cushion extends beyond the tightening tabs so that when the tabs are fastened together the cushion ends are compressed on one another to provide a full 360° encirclement of the pipe. This complete encirclement minimizes the entrance of abrasive particles between the clamp and the pipe. The cushion has a pair of end ridges at the axially opposite ends of the clamp, the ridges extending radially inwardly to press against the pipe. The tops of the ridges have beads on their axially outer surfaces to assure that the ridges will curl out when the cushion is clamped around the pipe, rather than curling inwardly. The cushion also has a middle ridge located between the end ridges and of a height less than the end ridges, so that when the cushion is deformed enough for the middle ridge to contact the pipe, the end ridges will already have been curled out considerably. If the pipe tilts with respect to the clamp, tilting occurs about the center ridge, with one end ridge curling even further and the opposite end ridge curling less. However, both end ridges will remain in contact with the pipe over a wide range of tilting angles, to thereby minimize the entrance of abrasive dust particles.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a clamp constructed in accordance with the invention, showing it in an installed configuration;

FIG. 2 is a front elevation view of the clamp of FIG. 1, in an open configuration;

FIG. 3 is a front elevation view of the clamp of FIG. 1 in a closed configuration;

FIG. 4 is a plane view of the clamp of FIG. 1;

FIG. 5 is a sectional view taken on the line 5—5 of FIG. 2, showing the cross section of the undeformed clamp;

FIG. 6 is a view taken on the line 6—6 of FIG. 3, showing the cross section of the clamp when it is fully deformed;

FIG. 7 is a view similar to FIG. 6, but showing the configuration when a pipe slides axially along the clamp;

FIG. 8 is a sectional view of the clamp of FIG. 1, showing the configuration thereof when the pipe tilts with respect to the clamp;

FIG. 9 is a partial sectional view of a clamp showing another form of a clamp cushion;

FIG. 10 is a front elevation view of the frame portion of a clamp constructed in accordance with another embodiment of the invention; and FIG. 11 is a front elevation view of a clamp constructed in accordance with another embodiment of the invention.

DESCRIPTION OF THE PREFERRED EMBODIMENTS

FIG. 1 illustrates a clamp 10 constructed in accordance with the invention, which holds a pipe P to a support S. The clamp includes a steel frame 12 with a pair of tabs 14, 16 that are held together by a screw fastener 18 and a mount portion 20 that is held to the support by a pair of screw fasteners 22. A cushion 24 of elastomeric material is mounted on the frame and provides a yielding surface to contact the pipe P. The clamp may be installed by first mounting it on the support S with the screws 22. The clamp is then opened to receive the pipe P and the other screw 18 is installed to tighten the clamp on the pipe. The frame 12 is constructed so that tightening of the clamp on the pipe, by turning screw 18, is performed separately from mounting of the clamp on the support by turning screws 22. This separation of tightening and mounting facilitates installation, since the clamp can be already held in place when a workman projects a screw through the tightening tabs 14, 16. Also, short tabs 14, 16 can be used to minimize the possibility of their bending, and yet the mount portion 20 can be allowed to extend a substantial distance from the cushion 24 to permit greater lateral movement of the pipe P.

Referring also to FIGS. 2–8, the frame 12 includes a band portion 26 having a shape similar to the frame of a prior art clamp, and including an encircling portion 28 and the tabs 14, 16. The tabs 14, 16 which extend from the ends of the encircling portion 28, are designed to be drawn against one another to tighten the encircling portion 28 on the pipe. The mounting portion 20 of the frame has an inner region 30 welded to the band portion 26 and has an outer region 32 that forms screw-receiving holes 34. The holes 34 have axes 36 out of line with the tightening tabs 14, 16. This permits a workman to apply a screwdriver to the mounting screw 22 without interference from the tabs. The fact that the holes 38 in the tabs are used only to receive a tightening screw 18, and not for mounting of the clamp on a support, means that a shorter tab length can be utilized, which provides greater rigidity against loosening of the clamp on the pipe. This greater rigidity against loosening of the pipe is obtained in addition to greater flexibility along the mount portion 20 that permits greater lateral movement of the pipe. The mount portion 20 can be provided with a single fastener hole, indicated in phantom lines at 39 (FIG. 4) where this is considered sufficient.

The cushion 24 has a cross section, when undeformed, which is best shown in FIG. 5. The cushion has a pair of end ridges 40, 42 which are located at the axially opposite ends of the clamp, that is, at the opposite ends with respect to the axis 44 of the pipe. Each of the ridges 40, 42 extends radially-inwardly from the body portion 46 of the cushion, that is, each ridge generally extends towards the axis 44 of the encircled pipe. The cushion also has a center or middle ridge 48 located axially between the two end ridges. The cushion is designed so that it deforms to the configuration illustrated in FIG. 6 when it is pressed hard against the pipe P. The two end ridges 40, 42 then curl radially outwardly, that is, they deform away from the middle ridge 48 rather than curling radially inwardly. Outward curling is encouraged by forming the axially outer surfaces 50, 52 of the ridges so that their top portions 50t, 52t extend axially outwardly (away from the center ridge 48) further than the bottom locations 50b, 52b. The bottom locations 50b, 52b are the locations at the same depth as the bottom points 54b, 56b of the axially inner surfaces 54, 56 of the ridges. One way to form the cushion so as to encourage rollout of the end ridges is illustrated in FIG. 9, wherein the outer surfaces 60, 62 of the ridges have a constant reverse slope angle A with respect to the radial direction R. However, easier injection molding of the cushion is possible by forming it in the manner illustrated in FIG. 5, wherein the top portions 50t, 52t form beads that bulge axially outwardly at the top of the ridges, and with most of the outer surfaces 50, 52 extending in a substantially radial direction.

Outward curling of the ridges is further assured by forming the radially inner surfaces 54, 56 at a large inward slope angle B with respect to the radial direction indicated by arrow R. An angle B of more than about 30° assures that the inner ridge portions will strongly resist inward curling, particularly when combined with the construction of the outer surface portions so that they will tend to curl out. The middle ridge 48 is of much smaller height than the end ridges 40, 42, each of the end ridges preferably having a height which is at least 50 percent greater than the height of the middle ridge. The middle ridge is designed to resist any curling by forming its side walls at a large positive angle from the radial direction, and by forming it with a wide top. When the cushion 24 is pressed hard against the pipe P, as illustrated in FIG. 6, the ridges curl outwardly until the middle ridge 48 contacts the pipe and is slightly deformed thereagainst.

The outward curling of the end ridges 40, 42 serves to minimize the entrapment of abrasive particles in the environment when the pipe P slides with respect to the clamp. FIG. 7 illustrates the situation where the pipe P is moving in the direction of arrow 64 with respect to the cushion 24. One of the ridges 42 which would encounter any abrasive particles on the pipe P is curled more sharply at the location 66 where its leading edge contacts the pipe. The ridge 42 therefore tends to push any abrasive particles along the pipe rather than to entrap the particles under the ridge. The trailing ridge 40 tends to curl more gradually away from the pipe at the point 68 where it leaves the pipe, but since any particles on the pipe are not being pushed into this ridge the more gradual curvature is not detrimental. Back and forth movements of the pipe P are common in hydraulic lines that are subject to high pressure surges. The cushion of this invention is constructed to permit such axial pipe movement, but with the cushion wiping away abrasive particles rather than entrapping them which could cause rapid wear.

FIG. 8 illustrates a situation wherein the pipe P is tilted with respect to the cushion at an angle C. In this case, the bottom 24B of the cushion is deformed so that one ridge 42 is curled slightly more than usual while the other ridge 40 is curled slightly less than usual. The reverse changes in curling occur at the top 24T of the cushion. The middle ridge 48 serves as a fulcrum about which relative tilting occurs. The ridge 48 assures that there is only a small change in curling at each end ridge, which assures that the ridge which is curled less, such as the ridge 40 at the bottom of the cushion, will not completely leave contact with the pipe. By assuring contact of all portions of the end ridges even at substantial tilting of the pipe, the cushion prevents the entrance of abrasive particles when large axial pipe movement occurs at a time when the pipe is tilted. This manner of operation may be compared to a construction without a middle ridge, wherein one of the end ridges might then deform much more so that part of the opposite end ridge might completely lift off the pipe.

The cushion 24 is constructed with a core 70 of glass cloth and the body 46 of elastomeric material such as silicon rubber. The cushion is split at the outside at 72 to permit the reception of the encircling portion 28 of the metal frame. The frame may be constructed of stainless steel or other structurally strong material. Before the clamp is put into service, a lubricant coating 74 is placed on the inner portion of the cushion to facilitate sliding of the pipe with respect to the cushion.

In order to minimize the entrance of abrasive particles between the cushion and pipe, the cushion should provide a complete 360° seal around the pipe. FIG. 2 illustrates the shape, when undeformed, of the circumferentially or angularly spaced opposite ends 76, 78 of the cushion which are brought together when the tabs 14, 16 are fastened together. In order to assure good cushion sealing to the pipe, the cushion ends 76, 78 are constructed to extend circumferentially beyond the tabs 14, 16, at least at the radially inward cushion locations that contact the pipe. This is accomplished by tapering the radially inward portions of the cushion ends 76, 78 so that the inward portions extend at an angle D from a radial direction and therefore are compressed on one another when the tabs 14, 16 are fastened together. This tapering positions the radially innermost cushion location such as 76r beyond the cushion location 76t which is even with the tab 14.

FIG. 10 illutrates a clamp 90 constructed in accordance with another embodiment of the invention, which utilizes a frame 92 that is constructed of a single strip of metal, with a mount portion 94 that is integral with one of the tightening tabs 96 and which is formed as an extension of the tab 96. The rest of the frame, including an encircling portion 98 and a second tab 100, is similar to the frame 26 described above. The frame 92 still permits separate fasteners 102, 104 to be utilized to tighten the clamp around a pipe and to mount the clamp, and with the mounting holes in the tabs out of line with the mounting holes in the mount portion 94. In order to permit use of a strip of constant width, the holes in the mount portion are located close together, where more than one mount hole is required.

In some situations, it is desirable to provide two widely separated mounting locations for the clamp. FIG. 11 illustrates a clamp 110 with two mounting strap portions 112, 114 that permit mounting of the clamp at two spaced locations on a support. One of the mount portions 112 is integral with the frame portion that encircles the pipe, while the other mount portion 114 is formed by a separate strip of metal with an inner portion at 116 that is welded to the main frame and with an outer portion 118 extending from the main frame.

Thus, the invention provides a pipe mounting clamp which facilitates installation and assures controlled engagement with a pipe. The clamp has a frame with a mount portion that is separate from the tightening tabs, to permit mounting of the clamp separately from tightening of the clamp so that the clamp can be constructed to maximize its performance in each function. The mount portion has a fastener-receiving hole whose axis is out of line with the tightening tabs, so that there is no interference from the tabs when a screwdriver is applied to the fastener that extends through the mounting hole. The cushion of the clamp is constructed with end ridges that are formed to assure axially outward curling, and with a middle ridge shorter than the end ridges to control the amount of curling of the end ridges especially when the pipe tilts with respect to the clamp. The cushion has circumferential ends that extend beyond the tightening tabs, to provide a complete encirclement of the pipe. The complete encirclement and outwardly curled end ridges minimize the entrapment of abrasive particles and permits controlled axial sliding of the pipe with respect to the clamp when large axial forces are applied to the pipe. The clamp is especially useful in applications such as in holding down hydraulic lines of an airplane, where the lines are subject to large axial movements and are located in an abrasive environment, and where high reliability is very important. Clamps of the type described above have been found to greatly dampen vibrations of hydraulic lines held by the clamps, which is believed due to the small contact area with the hydraulic lines, along the ridges of the cushion. The clamps also have been found to withstand extremely severe conditions of the type which can occur in hydraulic lines in airplanes.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A pipe mounting clamp comprising:
   a band for encircling a pipe, said band having a pair of tab portions fastenable to each other to tighten the band on the pipe; and
   a cushion of resilient material covering the radially inner surface of the band to contact and encircle the pipe, said cushion having a pair of radially-inwardly extending end ridges at the axially opposite ends of the cushion and having a middle ridge located between said end ridges, each of said end ridges having a height which is at least 50 percent greater than the height of said middle ridge, whereby the middle ridge does not contact a pipe until the end ridges have been severely deformed.

2. The clamp described in claim 1 including:
   a clamp support, said band being mounted on said support; and
   a pipe, said band and cushion surrounding said pipe to tend to hold it at a predetermined orientation with respect to said clamp support, but said pipe being free to tilt with respect to said predetermined orientation;
   said end ridges being angled to extend away from said middle ridge and said cushion being tightened sufficiently on said pipe so that the middle ridge contacts the pipe while the end ridges are deformed away from the middle ridge, whereby when the pipe tilts it tends to tilt about the middle ridge as a fulcrum so that both end ridges tend to remain in contact with the pipe.

3. The clamp described in claim 1 wherein:
   each of said end ridges has an outer surface whose top portion has a bead that extends away from the middle ridge.

* * * * *